(12) United States Patent
Hall et al.

(10) Patent No.: US 6,230,004 B1
(45) Date of Patent: May 8, 2001

(54) REMOTE PROCEDURE CALLS USING SHORT MESSAGE SERVICE

(75) Inventors: Hans Hall; Stefan Willehadson, both of Uppsala (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/982,054

(22) Filed: Dec. 1, 1997

(51) Int. Cl.[7] .................................................. H04M 3/42
(52) U.S. Cl. .......................... 455/414; 455/466; 455/556
(58) Field of Search .................................. 455/466, 420, 455/550, 422, 414, 556

(56) References Cited

U.S. PATENT DOCUMENTS

| | | | |
|---|---|---|---|
| 4,519,068 | | 5/1985 | Krebs et al. ............................. 370/82 |
| 5,046,082 | | 9/1991 | Zicker et al. ........................... 379/59 |
| 5,109,403 | | 4/1992 | Sutphin ................................... 379/59 |
| 5,297,191 | | 3/1994 | Gerzberg ................................. 379/59 |
| 5,297,192 | | 3/1994 | Gerzberg ................................. 379/59 |
| 5,392,283 | * | 2/1995 | Bocci ....................................... 370/79 |
| 5,418,837 | | 5/1995 | Johansson et al. .................... 379/58 |
| 5,418,844 | | 5/1995 | Morrisey et al. ...................... 379/207 |
| 5,493,692 | * | 2/1996 | Theimer ................................. 455/26.1 |
| 5,577,103 | * | 11/1996 | Foti ........................................ 379/59 |
| 5,603,084 | | 2/1997 | Henry, Jr. et al. ................... 455/33.1 |
| 5,630,159 | | 5/1997 | Zancho .................................. 395/800 |
| 5,689,825 | * | 11/1997 | Averbuch ............................... 455/66 |
| 5,719,918 | * | 2/1998 | Serbetciouglu ........................ 379/58 |
| 5,794,142 | * | 8/1998 | Vanttila ................................. 455/419 |
| 5,796,727 | * | 8/1998 | Harrison ................................ 370/338 |
| 6,125,281 | * | 9/2000 | Wells .................................... 455/466 |

FOREIGN PATENT DOCUMENTS

| | | | |
|---|---|---|---|
| 0689368 | 12/1995 | (EP) | H04Q/7/22 |
| 2152215 | 12/1995 | (CA) | H04M/11/05 |
| 0777394 | 6/1997 | (EP) | H04Q/7/22 |
| 9708906 | 3/1997 | (WO) | H04Q/7/22 |
| 9732439 | 9/1997 | (WO) | H04Q/7/32 |

* cited by examiner

*Primary Examiner*—Edward F. Urban
*Assistant Examiner*—Nick Corsaro
(74) *Attorney, Agent, or Firm*—Jenkens & Gilchrist P.C.

(57) ABSTRACT

A procedure in a remote server is accessed via a wireless telecommunications network. At least one Short Message Service message is produced, which message represents a command that, if applied to the server, will invoke the procedure. The at least one message is sent to the server via the wireless telecommunications network. At the server, the command is reproduced from the at least one message.

24 Claims, 4 Drawing Sheets

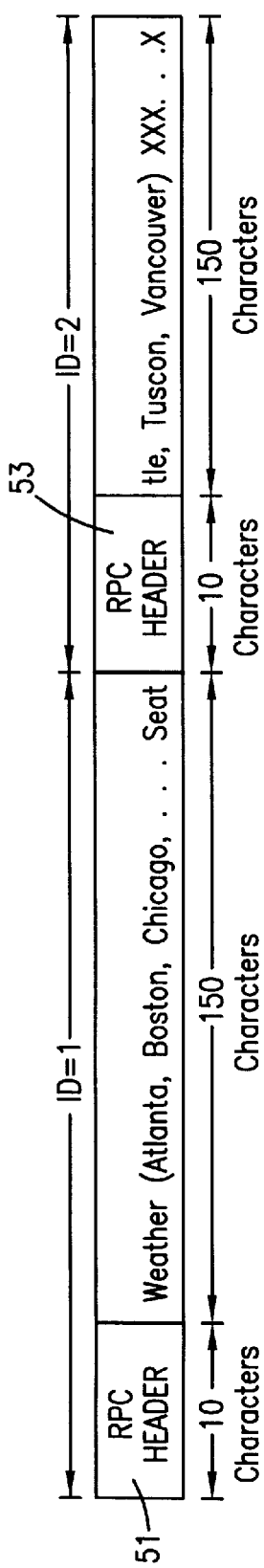
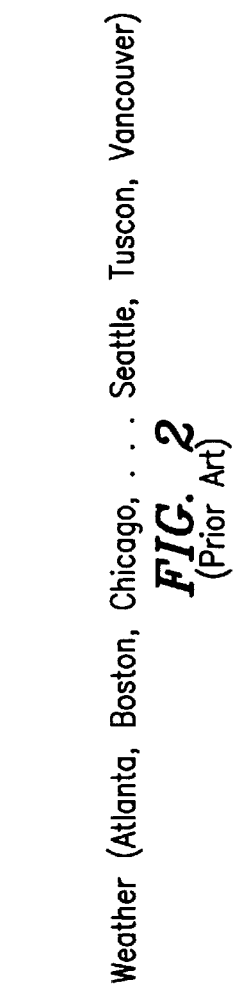
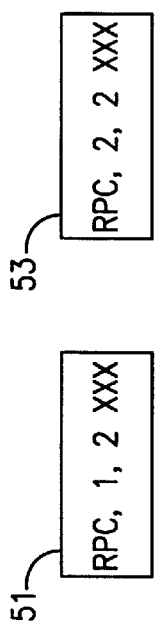
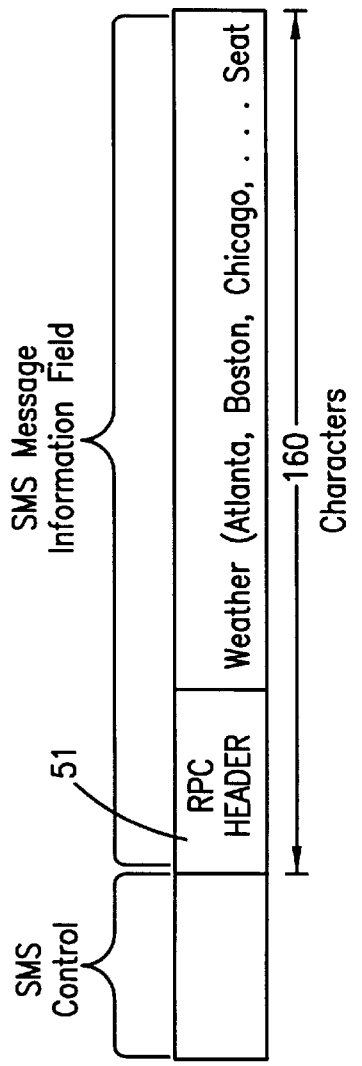

REMOTE PROCEDURE CALLS USING SHORT MESSAGE SERVICE

BACKGROUND OF THE INVENTION

With the increasing popularity and widespread use of wireless mobile telecommunication devices in wireless telecommunications networks, it is becoming increasingly important for such devices to provide as many services as possible.

However, wireless mobile communication devices such as mobile telephones typically do not use a powerful data processor. Also, there is not much extra space in the typical wireless mobile communication device to add additional hardware. It is therefore difficult for the mobile device to provide locally services that require data processor intensive calculations.

In some circumstances, a modem is connected to the mobile phone, for example, to revise the phone book database of the mobile phone, but there is no convenient way to automatically update data or program memory within the mobile phone other than by doing so manually.

It is therefore desirable to provide a wireless mobile communication device which provides to the user the capability of ordering and receiving the results of data processor intensive calculations.

It is also desirable to provide for automatic updating and modification of program and data memory within a wireless mobile communication device.

The present invention permits the user of a wireless mobile communication device to invoke and receive the results of data processor intensive calculations and to update and otherwise modify program and data memory within the mobile communication device. These features are provided by a Short Message Service (SMS) interface between the wireless mobile communication device and an appropriate resource that is available via a wireless network.

BRIEF DESCRIPTION OF THE DRAWINGS

FIG. 2 illustrates a remote procedure call that can be invoked in the server of FIG. 1 by the main computer of FIG. 1.

FIG. 5 illustrates an example output from the splitting functions of FIG. 4, and likewise illustrates an input to the joining functions of FIG. 4.

FIG. 6 illustrates a header portion of FIG. 5 in greater detail.

FIG. 7 illustrates another header portion of FIG. 5 in greater detail.

FIG. 8 illustrates an example output from the SMS control adding sections of FIG. 4, and likewise illustrates an input to the SMS control stripping sections of FIG. 4.

DETAILED DESCRIPTION OF THE DRAWINGS

Figure 1:
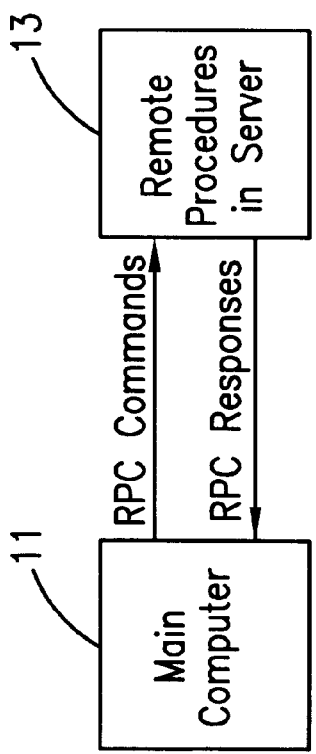
FIG. 1 is a block diagram which illustrates remote procedure calls in a conventional distributed computer system.

The present invention applies the Remote Procedure Call (RPC) technique of conventional distributed computer systems to a wireless telecommunications network. Prior art FIG. 1 illustrates a conventional distributed computer system. In FIG. 1, the main computer 11 accesses a remote server at 13 in order to invoke procedures supported by the server 13 to invoke the desired remote procedure. The main computer 11 sends an RPC command to the server 13 to invoke the desired remote procedure. The server 13 then executes the requested procedure in execution unit 37 and provides an RPC response back to the main computer.

Example FIG. 2 illustrates one example of a procedure on server 13 which might be invoked by main computer 11, namely, a procedure wherein the server 13 provides weather information relative to various geographic locations. The procedure is identified as Weather, and the desired geographic locations are set forth as operands separated by commas within parentheses. The remote server 13 executes the Weather procedure relative to the various geographic locations listed as operands.

Figure 3:
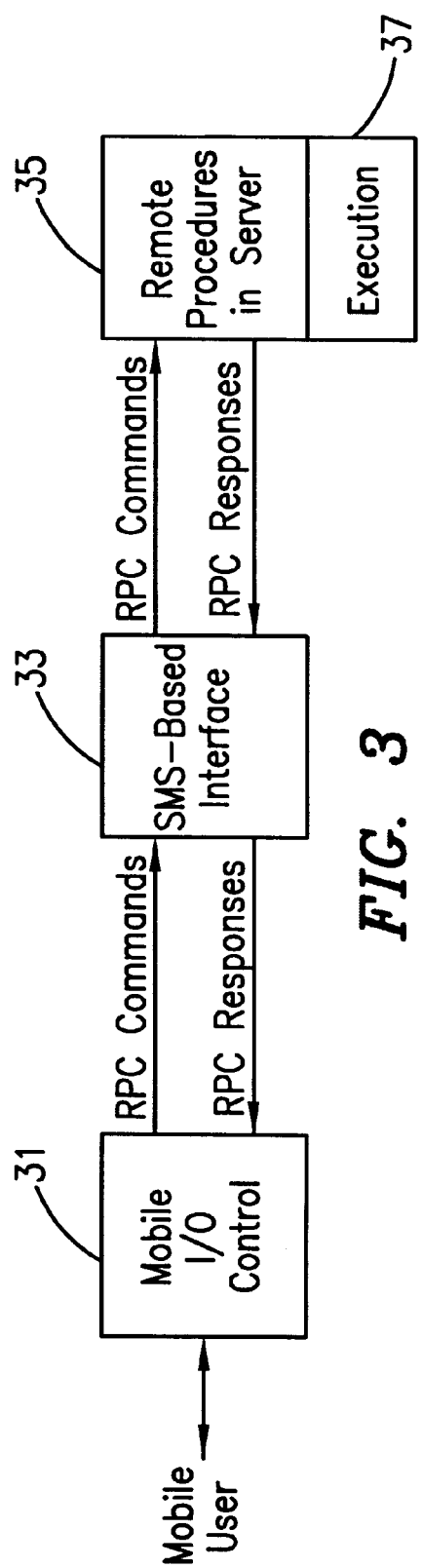
FIG. 3 is a block diagram which illustrates an SMS-based interface between a wireless mobile communication device and a remote server according to the present invention.

Example FIG. 3 illustrates one example of how the present invention uses Short Message Service (SMS) to implement remote procedure calls in a wireless network. When the mobile user requests an operation for which the wireless mobile communication unit has inadequate data processing facilities, or for which an external database must be accessed, the I/O control section 31 of the mobile unit determines that a remote procedure call to a remote server is necessary. The I/O control section then outputs an RPC command which can, in a conventional manner, be marshalled so as to have a serialized format such as the format of the prior art RPC command in FIG. 2. This RPC command passes through an SMS-based interface 33 and ultimately arrives at the remote server 35. The desired procedure is executed by the remote server 35, and its RPC response is provided back to the SMS-based interface 33 for ultimate delivery to the I/O control section 31 of the mobile unit.

Thus, to the I/O control section 31 of the mobile unit, the operation appears identical to that seen by the main computer 11 of prior art FIG. 1, namely, the I/O control section outputs an RPC command and thereafter receives the corresponding RPC response.

Figure 4:
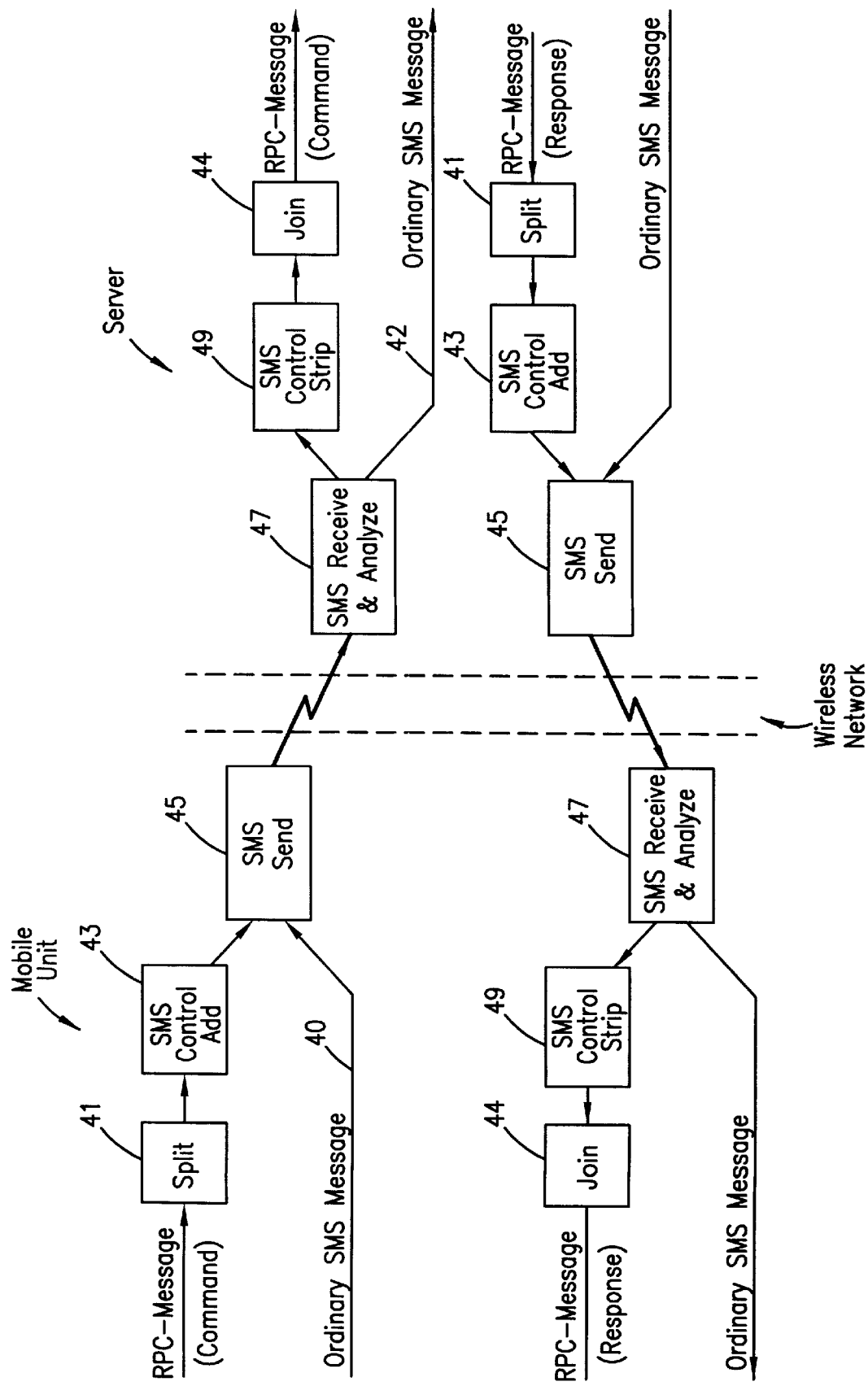
FIG. 4 illustrates one embodiment of the SMS-based interface of FIG. 3 in greater detail.

Exemplary FIG. 4 illustrates one embodiment of the SMS-based interface 33 of FIG. 3. The operation of FIG. 4 will be described with respect to the RPC command format illustrated in FIG. 2 and described above. When an RPC command such as shown in FIG. 2 is output from the I/O control section 31 of FIG. 3 and received at the splitting function 41 of the mobile unit, the splitting function splits the RPC command into as many SMS messages as are required to convey the entire command.

Example FIG. 5 illustrates the output of the splitting function 41. The informational portion of a conventional SMS message is limited to 160 characters and, in this example, 10 of those characters are reserved for an RPC header as shown at 51 and 53. Accordingly, if the RPC command is longer than 150 characters, then more than one SMS message will be required in FIG. 5. The splitting function provides the 10 characters for the RPC header, and allocates the next 150 characters to the first 150 characters of the RPC command of FIG. 2. The remaining characters of the RPC command must be handled in additional SMS messages as shown in FIG. 5. In the example of FIG. 5, two 160-character SMS messages are adequate to accommodate the entire RPC command. The X characters are "don't care" characters.

As shown in FIG. 5, each SMS message provided by the splitting function 41 includes a ten character RPC header.

The example header 51 of FIG. 5 is illustrated in more detail in FIG. 6, and the example header 53 of FIG. 5 is illustrated in more detail in FIG. 7. The header 51 includes three characters that identify the SMS message as an RPC command. The fourth character of the header is a comma, and the fifth character is an identification (ID) number which identifies the message in which the header 51 appears as the first (ID=1) message of the RPC command. The sixth character of the header 51 is another comma, and the seventh character identifies the number of SMS messages in this RPC command, in this example, 2.

The header 53 of FIG. 7 is similar to the header 51 of FIG. 6, but the ID=2 (see the fifth character) in this instance because the header 53 is associated with the second message of the RPC command. The header 53 also indicates that there are a total of two SMS messages in this RPC command (seventh character=2). In the examples of FIGS. 5–7, the final three characters of the RPC headers 51 and 53 are shown as "don't care" characters (X). It should be clear, however, that the size and informational content of the RPC headers can vary as required by the particular application.

In the example of FIGS. 5–7, the two SMS messages have ID=1 and ID=2, respectively. However, any desired identification scheme for ordering the SMS messages properly can be used. For example, if the first message has an ID=c, wherein c is a rational number, then the second message could have an ID=s(c), the third message could have an ID =s(s(c)), and so on, where s is a successor function that provides the respective ID numbers for the messages. In the example of FIGS. 5–7, c=1, and s(c)=c+1. As mentioned above, any type of identification scheme can be used to identify and order the SMS messages to insure that the RPC command is received and interpreted properly at the remote server. This will be discussed in more detail below.

The SMS control adding function 43 of the mobile unit in FIG. 4 receives as input the 160-character SMS messages (see FIG. 5) from the splitting function 41, and adds to these 160 informational characters the conventional SMS control characters which insure that the 160-character informational content of each message will traverse the conventional SMS data communication path properly. An example SMS message output from the function 43 is shown in example FIG. 8. The SMS control information is added by the function 43 to each of the SMS messages (FIG. 5) provided from the splitting function 41. Thus, the function 43 outputs a complete SMS message having the format of a conventional SMS message, including both SMS informational content and SMS control content as shown in FIG. 8. Each message output from the splitting function 41 (see FIG. 5) occupies the SMS informational field, and the SMS control adding function 43 adds the SMS control content. FIG. 8 illustrates the SMS format, produced by the function 43, which results when the function 43 receives the message having ID=1 in FIG. 5. Each message received by function 43 is put into conventional SMS format in similar fashion to that shown in FIG. 8. The SMS Send function 45 of the mobile unit in FIG. 4 receives the complete SMS messages from the function 43, and sends the SMS messages out in the conventional manner over a conventional SMS data communication path through the wireless network. The ordinary SMS message input 40 is held inactive by mobile I/O control 31 (FIG. 3) during processing of RPC commands through the SMS Send function, and the RPC command input is held inactive by mobile I/O control 31 (FIG. 3) during processing of an ordinary SMS message through the SMS Send function.

At the remote server, the SMS message is received and analyzed by the SMS Receive and Analyze function 47. This section can detect the presence or absence of the RPC header and thus identify whether the SMS messages constitute a remote procedure call. If no remote procedure call is detected, then the SMS message(s) is routed to the ordinary SMS channel 42. If a remote procedure call is identified, then the receive and analyze section 47 forwards the received SMS messages to the SMS control stripping function 49. The function 49 strips the SMS control portion (see FIG. 8) from the messages, and then forwards the remaining 160 characters to the joining function at 44. The joining function stores all of the messages of the RPC command in a memory, and then strips off the RPC header and sends the 150-character messages of FIG. 5 in the correct order to the remote procedure in the server.

The joining function applies the successor function s(c) to the ID in the RPC header of the first message received, and determines the proper ordering of the messages by subsequent application of s(c) as described above. The joining function can thus organize the 150-character messages into the appropriate order to reconstruct the RPC command that was originally received at the input of the splitting function 41 in the mobile unit. As mentioned above, both the splitting function 41 and the joining function 49 must utilize the same successor function so that the message can be split up and re-joined accurately. One or more successor functions can be stored in both the splitting function and the joining function. If more than one successor function is available, then the splitting function can insert into the RPC header a code which identifies which successor function is to be used in conjunction with the current RPC command. The joining function determines the proper successor function by inspecting the code in the RPC header.

The remote procedure in the server receives the RPC command in exactly the same format (see FIG. 2) as it would receive the RPC command in the conventional distributed computer system of FIG. 1. After the remote server has executed the desired procedure, it provides the RPC response, again in the same format as would be provided in the conventional system of FIG. 1.

Thereafter, the splitting function 41 and SMS control adding function 43 of the server, which can be identical to the splitting and SMS control adding functions in the mobile unit, provide an SMS message to the SMS Send function 45, which may also be identical to the SMS Send function in the mobile unit. Similarly, the SMS Receive and Analyze function 47 of the mobile unit which receives the SMS message from the wireless network may be identical to the SMS Receive and Analyze function of the server. The SMS control stripping function and the join function of the mobile unit can also be identical to the SMS control stripping function and join function described above with respect to the server. Thus, the RPC response from the remote server is split, provided with SMS control information, sent through the wireless network conventionally as one or more conventionally formatted SMS messages, received and analyzed and identified as an RPC response, and then the SMS control information is removed, and the SMS information fields are joined to reproduce the RPC response as it was originally provided by the remote server. This handling of the server's RPC response can thus mirror exactly the above-described handling of the RPC command.

Thus, and referring again to FIG. 3, the SMS-based interface 33 is transparent to the I/O control section 31 of the mobile unit. The I/O control section sees only that its conventional RPC commands receive conventional RPC responses in the same manner as seen by the main computer 11 in the prior art system of FIG. 1. The SMS-based interface 33 makes this possible as described above. The I/O control section 31 can now easily notify the source that necessitated the RPC, for example, the mobile user or a program in the mobile unit, that the RPC response is available.

Figure 9:
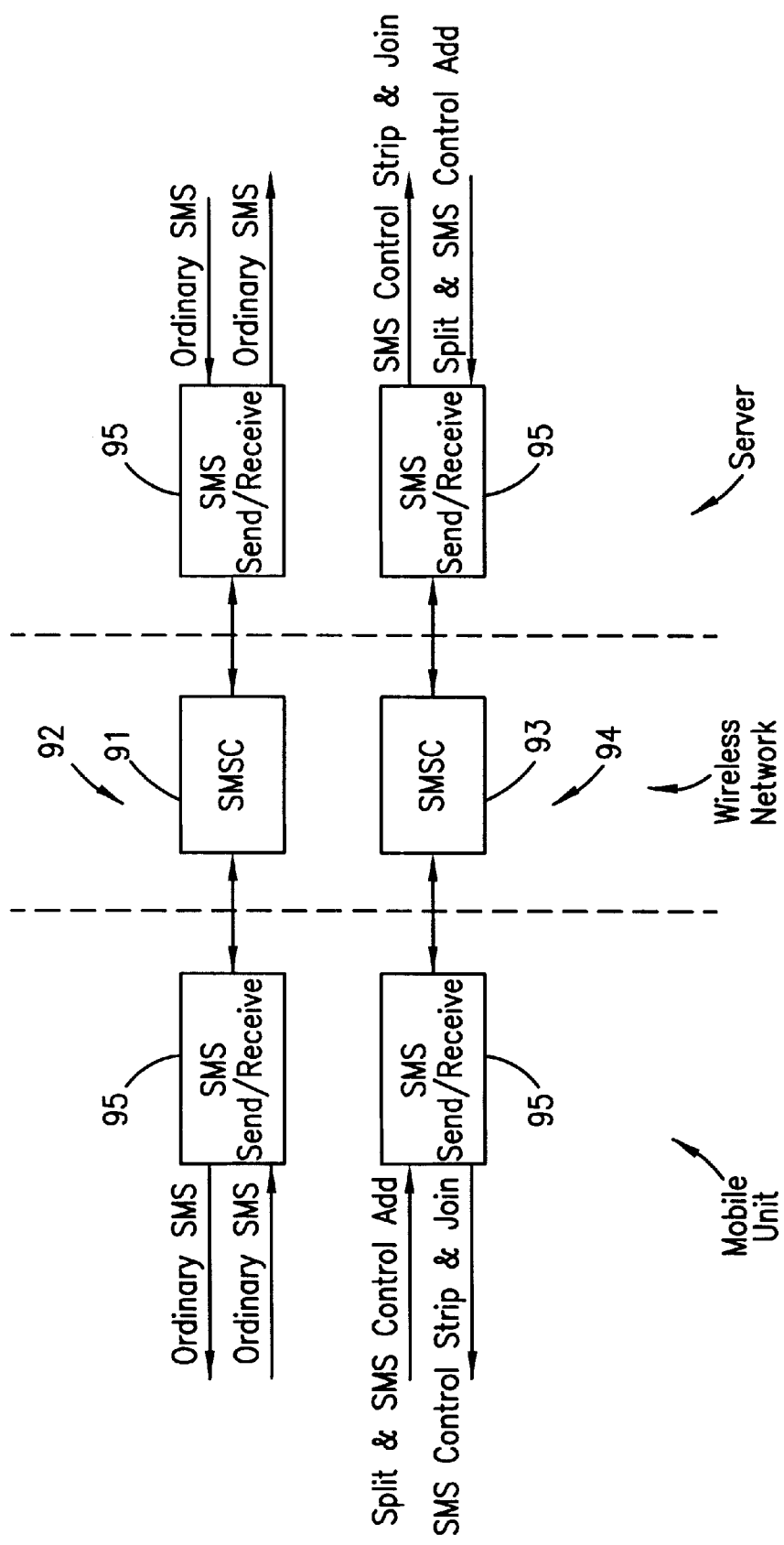
FIG. 9 is a block diagram which illustrates another exemplary embodiment of the SMS-based interface of FIG. 3.

Exemplary FIG. 9 illustrates two conventional SMS channels 92 and 94 through the wireless network, each including a conventional Short Message Service Center (SMSC). One SMSC 91 handles ordinary SMS messages, and the other SMSC 93 handles the RPC commands and responses in the form of SMS messages. Because two distinct SMSCs are used, one for RPC commands/responses and another for ordinary SMS messages, the RPC header of FIGS. 5–7 need not indicate that the message is an RPC command or response, because the RPC commands and responses will be routed through their own SMSC 93, and therefore need not be distinguished from the ordinary SMS messages which are routed through SMSC 91. Thus, the SMS receive and analyze functions 47 of FIG. 4 are not needed in FIG. 9. Note that only one conventional SMS channel with one conventional SMSC (not shown) is used in the wireless network in the FIG. 4 example. Thus, the FIG. 4 example requires the SMS receive and analyze functions and the RPC indication in the RPC header. The SMS send/receive blocks 95 of FIG. 9 each include conventional SMS send and receive channels.

It will be evident to workers in the art that the above-described joining, splitting, I/O control, SMS control add, SMS control strip, and SMS receive and analyze functions can be readily implemented in hardware circuits and/or software in the data processing section of a conventional wireless mobile communication device.

Although the Weather procedure is disclosed in the above examples, other types of procedures can also be accessed, such as procedures that download databases or database entries or computer programs, or procedures that perform other desired functions, such as a digital signing algorithm, foreign language translations, name look-up in a remote database, stock reports, travel directions, and a weather forecast for the current location of the mobile unit, and any function that does not have real-time constraints.

Although exemplary embodiments of the present invention have been described above in detail, this does not limit the scope of the invention, which can be practiced in a variety of embodiments.

What is claimed is:

1. A wireless mobile communication device, comprising:
    a controller having an output, said controller for automatically determining if said device has adequate resources to perform a data processing operation, and if not, invoking the output to produce a command for invoking the data processing operation in a server that is accessible to said wireless mobile communication device via a wireless telecommunications network and is operable in response to said command to provide at least one of data and a computer program for use by the wireless mobile communication device, said command including first information indicative of the data processing operation and second information indicative of an operand associated with the data processing operation;
    a user input for effecting the data processing operation needed by a user of said device; and
    an interface having an input coupled to said controller output to receive said command, said interface for expressing the command as at least one Short Message Service message, said interface including a splitter that determines from said command a quantity of Short Message Service messages required to express said command, and said interface having an output that outputs the least one Short Message Service message via the wireless telecommunications network to an external data processing resource to perform the data processing operation.

2. The device of claim 1, wherein said interface includes a further input that receives from the wireless telecommunication network a response produced by the data processing operation that said command invoked and expressed as at least one Short Message Service message, said interface having a further output which provides said response of the data processing operation invoked by said command, said controller having an input coupled to said further interface output.

3. The device of claim 2, wherein said interface includes an analyzer coupled to said further input to detect whether a Short Message Service message received at said further input represents said response, said analyzer having a first output to which the Short Message Service message is forwarded if it represents said response, and said analyzer having a second output to which the Short Message Service message is forwarded if it does not represent said response.

4. The device of claim 3, wherein said interface includes a joiner which is coupled to said first output of said analyzer to detect from said forwarded message a quantity of messages required to express said response.

5. The device of claim 4, wherein said joiner, when said quantity exceeds one, obtains from each said message information indicative of a position of that message in a predetermined ordered relationship among said messages.

6. The device of claim 1, wherein said splitter adds to said at least one message information indicative of said quantity.

7. The device of claim 1, wherein said splitter, when said quantity exceeds one, adds to each said message unique information indicative of a position of that message in a predetermined ordered relationship among said messages.

8. A method of accessing a data processing operation in a remote server via a wireless telecommunications network, comprising:
    inputting, by a user an indication that the data processing operation is needed;
    automatically determining if a mobile communication device has adequate resources to perform the data processing operation, and if not, producing a command that, if applied to the server, will invoke the data processing operation, said command including first information indicative of the data processing operation and second information indicative of an operand associated with the data processing operation;
    expressing the command as at least one Short Message Service message;
    sending said at least one message to the server that performs the data processing operation via the wireless telecommunications network; and
    at the server, reproducing the command from said at least one message and, in response to the reproduced command, providing for use by the mobile communication device at least one of data and a computer program.

9. The method of claim 8, including receiving from the server via the wireless telecommunications network a response produced by the data processing operation that the command invoked and expressed as at least one Short Message Service message, and reproducing the response from said at least one message.

10. The method of claim 9, including detecting whether a Short Message Service message represents said response; and thereafter, forwarding the Short Message Service message to a first data path if it represents said response, and forwarding the Short Message Service message to a second data path if it does not represent said response.

11. The method of claim 10, including detecting from a Short Message Service message on the first data path a quantity of Short Message Service messages required to express said response.

12. The method of claim 11, including, when said quantity exceeds one, obtaining from each message information indicative of a position of that message in a predetermined ordered relationship among said messages.

13. A method of accessing a data processing operation in a remote server via a wireless telecommunications network, comprising:

inputting, by a user, an indication that the data processing operation is needed;

automatically determining if a mobile communication device has adequate resources to perform the data processing operation, and if not producing a command that, if applied to the server, will invoke the data processing operation, said command including first information indicative of the data processing operation and second information indicative of an operand associated with the data processing operation;

expressing the command as at least one Short Message Service message, including determining from said command a quantity of said messages required to express said command;

sending said at least one message to the server that performs the data processing operation via the wireless telecommunications network; and at the server, reproducing the command from said at least one message and, in response to the reproduced command, providing for use by the mobile communication device at least one of data and a computer program.

14. The method of claim 13, including adding to said at least one message information indicative of said quantity.

15. The method of claim 13, including, when said quantity exceeds one, implementing an ordering scheme that identifies a predetermined ordered relationship among said messages.

16. The method of claim 15, including adding to each said message unique information indicative of a position of that message in said ordered relationship.

17. A method of using a wireless telecommunications network and a mobile communication device operable therein to effect performance of a data processing operation needed by a user of the mobile communication device, comprising:

the mobile communication device determining from a user input that the data processing operation is needed by the user;

the mobile communication device automatically determining whether the mobile communication device has adequate resources available for performing the data processing operation within the mobile communication device;

if the mobile communication device determines that adequate resources are not available for performing the data processing operation within the mobile communication device, the mobile communication device sending to an external data processing resource a command for the data processing operation, including using Short Message Service to transmit the command from the mobile communication device through the wireless telecommunications network to the external data processing resource;

the external data processing resource receiving the command and performing the data processing operation in response to the received command; and the external data processing resource sending a result of the data processing operation to the mobile communication device, including using Short Message Service to transmit the result from the external data processing resource through the wireless telecommunications network to the mobile communication device.

18. The method of claim 17, wherein said step of sending a result includes downloading data from the external data processing resource to the mobile communication device.

19. The method of claim 17, wherein said step of sending a result includes downloading a computer program from the external data processing resource to the mobile communication device.

20. The method of claim 17, wherein said step of sending a command includes sending from the mobile communication device to the external data processing resource a remote data processing operation call for execution of a data processing operation by the external data processing resource.

21. The method of claim 17, wherein said performing step includes performing a digital signing algorithm.

22. The method of claim 17, wherein said performing step includes performing a language translation operation.

23. The method of claim 17, wherein said step of sending a command includes sending to the external data processing resource first information indicative of the data processing operation and second information indicative of an operand associated with the data processing operation, and wherein said step of using Short Message Service to transmit the command includes expressing said first information and said second information as at least one Short Message Service message, and transmitting the at least one Short Message Service message from the mobile communication device through the wireless telecommunications network to the external data processing resource.

24. A wireless mobile communication device, comprising:

a controller having an input for receiving information from a user of the wireless mobile communication device, said controller for determining from the user input information that a data processing operation is needed by the user, and said controller further for automatically determining whether the mobile communication device has adequate resources available for performing the data processing operation within the mobile communication device, said controller having an output for producing, in response to a determination that adequate resources are not available for performing the data processing operation within the mobile communication device, a command for execution of the data processing operation by a data processing resource that is accessible to said wireless mobile communication device via a wireless telecommunications network; and an interface having an input coupled to said controller output to receive said command, and said interface having an output that outputs said command to the wireless telecommunications network using Short Message Service.

* * * * *

UNITED STATES PATENT AND TRADEMARK OFFICE
CERTIFICATE OF CORRECTION

PATENT NO.    : 6,230,004 B1
DATED         : May 8, 2001
INVENTOR(S)   : Hans Hall et al.

It is certified that error appears in the above-identified patent and that said Letters Patent is hereby corrected as shown below:

<u>Column 1,</u>
Line 4, insert -- FIELD OF INVENTION
    The invention relates generally to wireless telecommunications networks, and more particularly, to the use of a wireless mobile communication device to access a remote server via a wireless telecommunications network. --

Signed and Sealed this

Ninth Day of July, 2002

*Attest:*

*Attesting Officer*

JAMES E. ROGAN
*Director of the United States Patent and Trademark Office*